(12) United States Patent
Remy

(10) Patent No.: US 11,698,107 B2
(45) Date of Patent: Jul. 11, 2023

(54) SELF-CLAMPING TORQUE ADAPTER

(71) Applicant: Raytheon Company, Waltham, MA (US)

(72) Inventor: Christopher D. Remy, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 354 days.

(21) Appl. No.: 17/024,496

(22) Filed: Sep. 17, 2020

(65) Prior Publication Data

US 2022/0082130 A1    Mar. 17, 2022

(51) Int. Cl.
*F16D 1/08* (2006.01)
*B25B 13/50* (2006.01)
*F16B 2/04* (2006.01)

(52) U.S. Cl.
CPC ............ *F16D 1/0817* (2013.01); *B25B 13/50* (2013.01); *F16B 2/04* (2013.01)

(58) Field of Classification Search
CPC ......... B25B 13/12; B25B 13/18; B25B 13/24; B25B 13/50; F16D 1/0817; F16B 2/04; F16B 2/06
See application file for complete search history.

(56) References Cited

U.S. PATENT DOCUMENTS

| | | |
|---|---|---|
| 2,884,826 A | 5/1959 | Bruhu |
| 3,903,763 A | 9/1975 | Haight |
| 3,910,140 A * | 10/1975 | Rose ...................... B25B 13/18 81/91.3 |
| 6,290,209 B1 | 9/2001 | Son |
| 6,311,586 B1 | 11/2001 | Hirse |
| 6,339,978 B1 | 1/2002 | Hirse |
| 7,500,661 B2 | 3/2009 | Liu et al. |
| 8,479,615 B2 | 7/2013 | Wojick |
| 8,485,071 B2 | 7/2013 | Wojick |
| 8,893,592 B2 | 11/2014 | Womack |
| 9,114,508 B2 * | 8/2015 | Antonio ................. B25B 13/44 |
| 9,821,444 B2 * | 11/2017 | Herisse ................. B25B 13/20 |

(Continued)

FOREIGN PATENT DOCUMENTS

| | | |
|---|---|---|
| AU | 649941 B3 | 6/1994 |
| CA | 2104314 A1 | 2/1995 |

(Continued)

OTHER PUBLICATIONS

International Search Report for International Application No. PCT/US2021/042060 dated Oct. 18, 2021, 11 pages.

*Primary Examiner* — David B. Thomas

(57) ABSTRACT

A self-clamping torque adapter comprises a tool base, a central hub, a plurality of clamps, and a cam actuator mechanism. The tool base has a central axis and the central hub is rotatably coupled to the tool base and configured to rotate relative to the tool base about the central axis. The central hub comprises a torque input member configured to receive a torque input. The plurality of clamps are slidably coupled to the tool base, and configured to displace bi-directionally along a radial axis. The cam actuator mechanism couples each of the plurality of clamps to the central hub. Rotation of the central hub relative to the tool base causes the cam actuator mechanism to move each of the plurality of clamps in a radial direction.

22 Claims, 14 Drawing Sheets

(56) References Cited

U.S. PATENT DOCUMENTS

| | | | |
|---|---|---|---|
| 2007/0000353 A1* | 1/2007 | Yu | B25B 27/0042 81/3.4 |
| 2007/0228631 A1 | 10/2007 | Liu et al. | |
| 2011/0138972 A1 | 6/2011 | Wojick | |
| 2011/0209586 A1 | 9/2011 | Wojick | |

FOREIGN PATENT DOCUMENTS

| | | | |
|---|---|---|---|
| CA | 2706235 A1 | 5/2011 | |
| CA | 2706235 C | 11/2013 | |
| CA | 2686026 C | 1/2014 | |
| CH | 652067 A5 | 10/1985 | |
| CN | 87206315 U | 2/1988 | |
| CN | 2063464 U | 10/1990 | |
| CN | 2289645 Y | 9/1998 | |
| CN | 101070868 A | 11/2007 | |
| CN | 102328288 A | 1/2012 | |
| CN | 202192580 U | 4/2012 | |
| CN | 102328288 B | 4/2013 | |
| CN | 203813271 U | 9/2014 | |
| CN | 104786176 B | 5/2016 | |
| CN | 108000383 A | 5/2018 | |
| CN | 109209378 A | 1/2019 | |
| CN | 209244568 U | 8/2019 | |
| CS | 260359 B1 | 12/1988 | |
| CZ | 3685 U1 | 8/1995 | |
| DE | 3300033 A1 | 8/1984 | |
| DE | 19612755 A1 | 10/1997 | |
| DE | 19612757 A1 | 10/1997 | |
| DE | 19747536 | 10/1997 | |
| DE | 19753109 A1 | 6/1999 | |
| DE | 10064346 A1 | 7/2002 | |
| DE | 20218034 U1 * | 2/2003 | B25B 13/44 |
| DE | 19747536 B4 | 6/2004 | |
| DE | 19753109 B4 | 6/2004 | |
| DE | 202011105138 | 11/2011 | |
| EP | 0111627 A1 | 6/1984 | |
| EP | 0112788 A1 | 7/1984 | |
| EP | 0112788 B1 | 7/1987 | |
| EP | 2324959 A2 | 5/2011 | |
| GB | 674154 A | 6/1952 | |
| IN | 173957 B | 8/1994 | |
| IN | 179059 B | 8/1997 | |
| RU | 2114729 C1 | 7/1998 | |
| SU | 1209426 A1 | 2/1986 | |
| WO | WO 1997/036714 A1 | 10/1997 | |
| WO | WO 1997/036715 A1 | 10/1997 | |
| WO | WO 1997/036716 A1 | 10/1997 | |
| WO | WO 1997/036717 A1 | 10/1997 | |
| WO | WO 1999/021685 A1 | 5/1999 | |
| WO | WO 1999/028090 A1 | 6/1999 | |
| WO | WO-2007123550 A1 * | 11/2007 | B25B 13/18 |
| WO | WO 2009/043237 A1 | 4/2009 | |

* cited by examiner

SELF-CLAMPING TORQUE ADAPTER

GOVERNMENT LICENSE RIGHTS

This invention was made with government support under government contract DOTC-17-01-INIT0179, awarded by the United States Department of Defense. The government has certain rights to the invention.

BACKGROUND

Components of an assembly are often held together using threaded fasteners. In some instances, a structure or component can have a thread and be threaded directly onto another structure or component. When threaded fasteners or components are coupled together with a threaded connection, it can be important to torque the threaded connection to a specific torque value or within a range of specific torque values to ensure joint integrity. This can be accomplished using a torque wrench or other similar torque tool. It is relatively easy to torque a threaded fastener to a specific value using a torque wrench, but it can be difficult to torque a nonstandard component that directly threadably couples to another component to a set value since it may not accept a common torque wrench. For example, some structures or components, such as a cylindrical shell or cone shaped component that directly couples to another mating component, may not have any structure at the center of rotation and thus cannot receive a standard torque wrench. In such instances it may be necessary to grip the outer surface of the structure or component when threading this to another structure or component.

In other examples, a structure or component can have tooling features for receiving a torque tool. However, these features can be damaged when tightening or loosening the component from another component due to high point loads. One tool that can grip the outer surface of a component without requiring any tooling features is a strap wrench, which includes a belt that wraps around the component and pinches/tightens as a torque is applied. A strap wrench is capable of rotating most structures or components, but can have drawbacks depending on the structure or component being torqued. If the structure or component is made out of a relatively brittle or otherwise delicate material, the strap wrench can damage the structure or component when applying torque. This can be caused by the strap wrench applying a point load where the strap wrench pinches the strap around the structure or component. Additionally, the torque applied to the strap wrench is applied off center. In addition, the belt may deflect/stretch as torque is applied. Either or both of these can result in inconsistent or inaccurate torque values.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
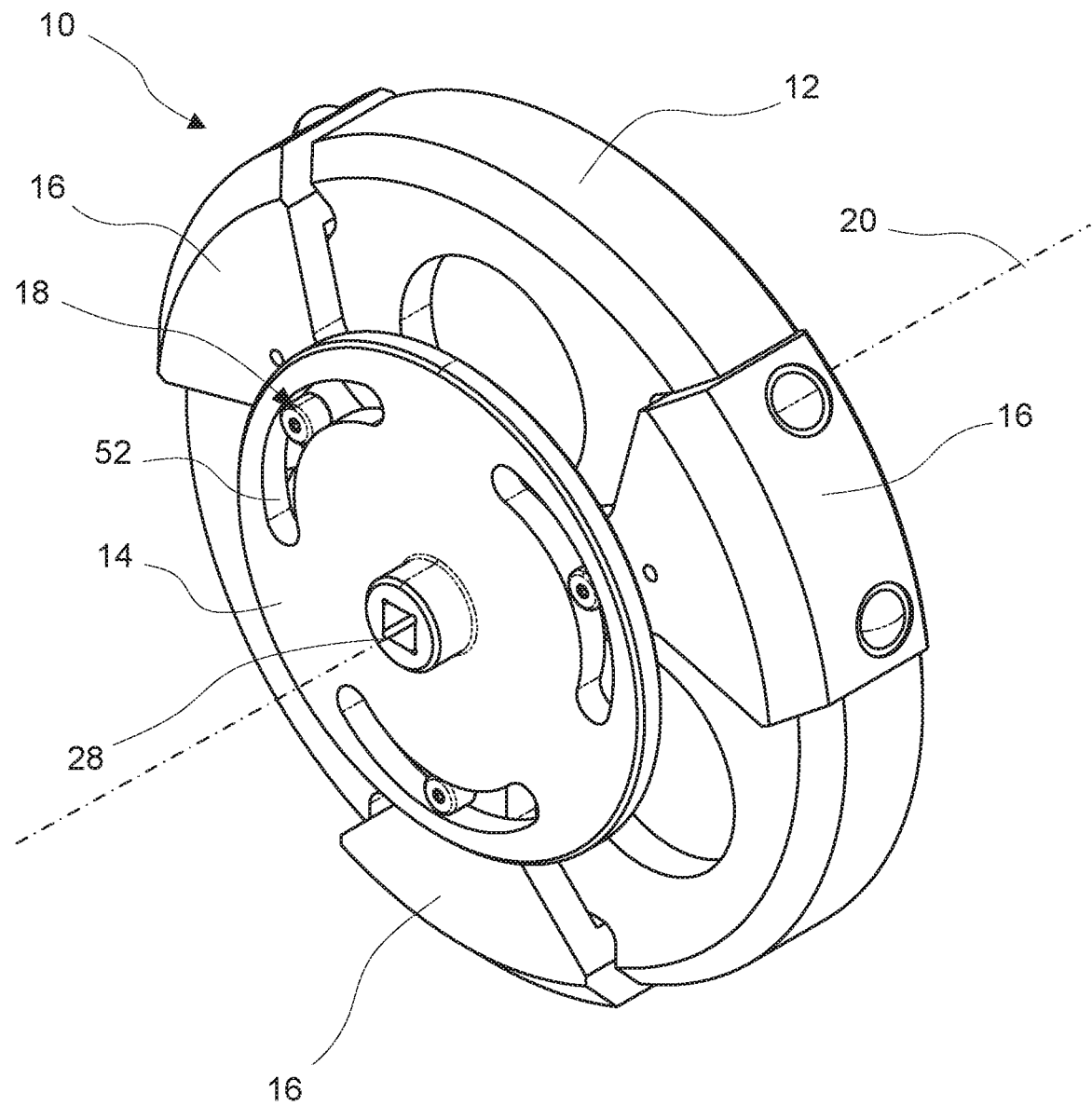
FIG. 1 is an isometric view of a self-clamping torque adapter with a plurality of clamps shown positioned in a default position, in accordance with an example of the present disclosure.

Reference will now be made to the exemplary embodiments illustrated, and specific language will be used herein to describe the same. It will nevertheless be understood that no limitation of the scope of the disclosure is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of the disclosure is provided below and then specific examples are described in further detail later. This initial summary is intended to aid readers in understanding the examples more quickly, but is not intended to identify key features or essential features of the examples, nor is it intended to limit the scope of the claimed subject matter.

The present disclosure is directed to a self-clamping torque adapter for torqueing an object. The present disclosure is also directed to various torqueing systems and a method of torqueing an object.

In one example, disclosed is a self-clamping torque adapter. The self-clamping torque adapter comprises a tool base having a central axis, a central hub rotatably coupled to the tool base and configured to rotate relative to the tool base about the central axis, the central hub comprising a torque input member configured to receive a torque input, a plurality of clamps slidably coupled to the tool base, and configured to displace bi-directionally along a radial axis, and a cam actuator mechanism coupling each of the plurality of clamps to the central hub, wherein rotation of the central hub relative to the tool base causes the cam actuator mechanism to move each of the plurality of clamps in a radial direction.

In accordance with a more detailed aspect, the self-clamping torque adapter can further comprise at least one spring biasing a clamp of the plurality of clamps in a radial direction.

In accordance with a more detailed aspect, each of the plurality of clamps can comprise a friction modifier configured to increase friction between a respective clamp and an object being clamped.

In accordance with a more detailed aspect, the central hub can comprise a plurality of curved slots and the cam actuator mechanism can comprise a plurality of shafts with each shaft disposed in a respective slot of the plurality of slots, and each shaft can be coupled to a respective clamp of the plurality of clamps.

In accordance with a more detailed aspect, the cam actuator mechanism can comprise a range of travel limited by a configuration of the curved slots, thus providing a hard stop of each of the plurality of clamps, and thus limiting radial travel of the plurality of clamps.

In accordance with a more detailed aspect, the hard stop limits travel of the plurality of clamps in at least one of a radially outward direction or a radially inward direction.

In accordance with a more detailed aspect, a centroid of each of the plurality of curved slots can be located between the plurality of curved slots, respectively, and the central axis.

In accordance with a more detailed aspect, a centroid of each of the plurality of curved slots can be located outside of an area between the plurality of curved slots, respectively, and the central axis.

In accordance with a more detailed aspect, a distance between the central axis and a point in the curved slots at a location offset from a midpoint of the curved slots and along a central plane of the curved slots can be one of (i.e., either one, but not both) greater than or less than a distance between the central axis and the midpoint.

In accordance with a more detailed aspect, the torque input member can comprise at least one of a polygonal recess, a polygonal protrusion, a starred recess, and a starred protrusion.

In accordance with a more detailed aspect, each of the plurality of clamps can have a default position, and wherein, with each of the plurality of clamps in the default position, a counterclockwise rotation of the central hub relative to the tool base can cause each of the plurality of clamps to move in a first direction relative to the default position, and a clockwise rotation of the central hub relative to the tool base can cause each of the plurality of clamps to also move in the first direction relative to the default position. The first direction can be an inward direction relative to the central axis in some examples. In other examples, the first direction can be an outward direction relative to the central axis.

In accordance with a more detailed aspect, the tool base can comprise a plurality of linear slots extending in a radial direction and each of the plurality of clamps can be slidably coupled to the tool base by at least one bolt extending through a linear slot of the plurality of linear slots.

In accordance with a more detailed aspect, each of the bolts can be limited in radial travel by a respective linear slot thus providing a hard stop of each of the plurality of clamps, and thus limiting radial travel of the plurality of clamps.

Also disclosed is a torqueing system. The system comprises an object to be torqued and a self-clamping torque adapter. The object has a torque receiving surface and an axis of rotation. The self-clamping torque adapter comprises a tool base having a central axis aligned with the axis of rotation, a central hub rotatably coupled to the tool base and configured to rotate relative to the tool base about the central axis, the central hub comprising a torque input member configured to receive a torque input, a plurality of clamps slidably coupled to the tool base, and configured to displace bi-directionally along a radial axis to apply a clamping force to the torque receiving surface, and a cam actuator mechanism coupling each of the plurality of clamps to the central hub, wherein rotation of the central hub relative to the tool base causes the cam actuator mechanism to move each of the plurality of clamps in a radial direction to provide a variable clamping force to the object to be torqued depending upon the travel of the plurality of clamps.

In accordance with another aspect, the system can further comprise comprising a friction modifier disposed between each of the clamps and the torque receiving surface.

In accordance with another aspect, the central hub can comprise a plurality of curved slots and the cam actuator mechanism can comprise a plurality of shafts with each shaft disposed in a respective slot of the plurality of slots, and wherein each shaft can be coupled to a respective clamp of the plurality of clamps.

In accordance with another aspect, a centroid of each of the plurality of curved slots can be located between the plurality of curved slots, respectively, and the central axis.

In accordance with another aspect, a centroid of each of the plurality of curved slots can be located outside of an area between the plurality of curved slots, respectively, and the central axis.

In accordance with another aspect, each of the plurality of clamps can have a default position, and wherein, with each of the plurality of clamps in the default position, a counterclockwise rotation of the central hub relative to the tool base can cause each of the plurality of clamps to move in a first direction relative to the default position and the central axis, and a clockwise rotation of the central hub relative to the tool base can cause each of the plurality of clamps to also move in the first direction relative to the default position and the central axis.

Also disclosed is a method of torqueing an object. The method includes positioning a self-clamping torque adapter proximate an end of an object being torqued and applying a torque to the self-clamping torque adapter. The self-clamping torque adapter comprises a tool base having a central axis aligned with an axis of rotation of the object being torqued, a central hub rotatably coupled to the tool base and configured to rotate relative to the tool base about the central axis, the central hub comprising a torque input member configured to receive a torque input, a plurality of clamps slidably coupled to the tool base, and configured to displace bi-directionally along a radial axis, and a cam actuator mechanism coupling each of the plurality of clamps to the central hub, wherein rotation of the central hub relative to the tool base causes the cam actuator mechanism to move each of the plurality of clamps in a radial direction to provide a variable clamping force to the object being torqued. Applying the torque to the torque input member causes the central hub to rotate relative to the tool base and each of the plurality of clamps to move radially to apply a clamping force to the object being torqued.

To further describe the present technology, examples are now provided with reference to the figures. FIGS. 1 through 5 illustrate a self-clamping torque adapter 10 in accordance with at least one example of the present disclosure. The self-clamping torque adapter 10 can comprise a tool base 12, a central hub 14, a plurality of clamps 16, and a cam actuator mechanism 18. The tool base 12 can have a central axis 20 and the central hub 14 can be configured to rotate about the central axis 20 of the tool base 12, with the tool base 12 and the central hub 14 being rotatably coupled together, meaning the tool base 12 and the central hub 14 can be configured such that they rotate relative to one another. For example, the tool base 12 can have an aperture 22 formed therein, and the central hub 14 can have a shaft 24 sized and shaped to fit within and to be received in the aperture 22. The shaft 24 may be held in place within the aperture 22 using conventional techniques, such as a snap ring 26. Friction between the walls of the aperture 22 and the shaft 24 may be reduced by the use of grease or a bearing to allow the central hub 14 to rotate freely relative to the tool base 12. The particular coupling arrangement shown is not intended to be limiting in any way as those skilled in the art will recognize other ways that the tool base 12 and the central hub 14 can be rotatably coupled to one another.

The tool base 12 can comprise an outer rim or flange 13 oriented orthogonally to an upper surface of the tool base 12. The outer rim or flange 13 can extend fully around the perimeter of the tool base 12, except for a series of cutouts configured to receive the plurality of clamps 16, The outer rim or flange 13 can comprise a diameter slightly greater than an outer diameter of an object to be torqued, thus facilitating the fitting of the self-clamping torque adapter 10 to the object to be torqued.

The central hub 14 can comprise a torque input member 28 configured to receive a torque input, such as a torque from a hand tool, a powered tool, or a fixed handle configured to interface with the torque input member 28. The example torque input member 28 shown in FIG. 1 comprises a square recess or socket configured to receive and interface with a standard sized torque wrench. Other types of torque input members are possible. For example, the torque input member 28 can comprise a polygonal recess or socket, a polygonal protrusion, a starred recess or socket, a starred protrusion, or flats formed in a side of a protrusion. The torque input member 28 can be centered relative to a center of rotation of the self-clamping torque adapter 10 for greater accuracy when using a torque wrench to rotate the self-clamping torque adapter 10.

The plurality of clamps 16 can be slidably coupled to the tool base 12 and configured to displace bi-directionally along a radial axis 30 (see FIGS. 2, 3) relative to the tool base 12. The self-clamping torque adapter 10 can have at least three clamps 16 to provide at least three points of contact with an object to be torqued. In the example shown, the tool base 12 has a plurality of radial slots 32 formed therein (see FIG. 4) and each clamp 16 of the plurality of clamps can be secured to the tool base 12 by an inner fastener (e.g., bolt 46) and an outer fastener (e.g., bolt 48) extending through a respective one of the radial slots 32 and into a respective socket 38 of the tool base 12. In one aspect, the sockets 38 can comprise threads to provide a threaded interface with the inner and outer bolts 46, 48, respectively. The radial slots 32 can be straight slots extending along the radial axis 30.

Figure 4:
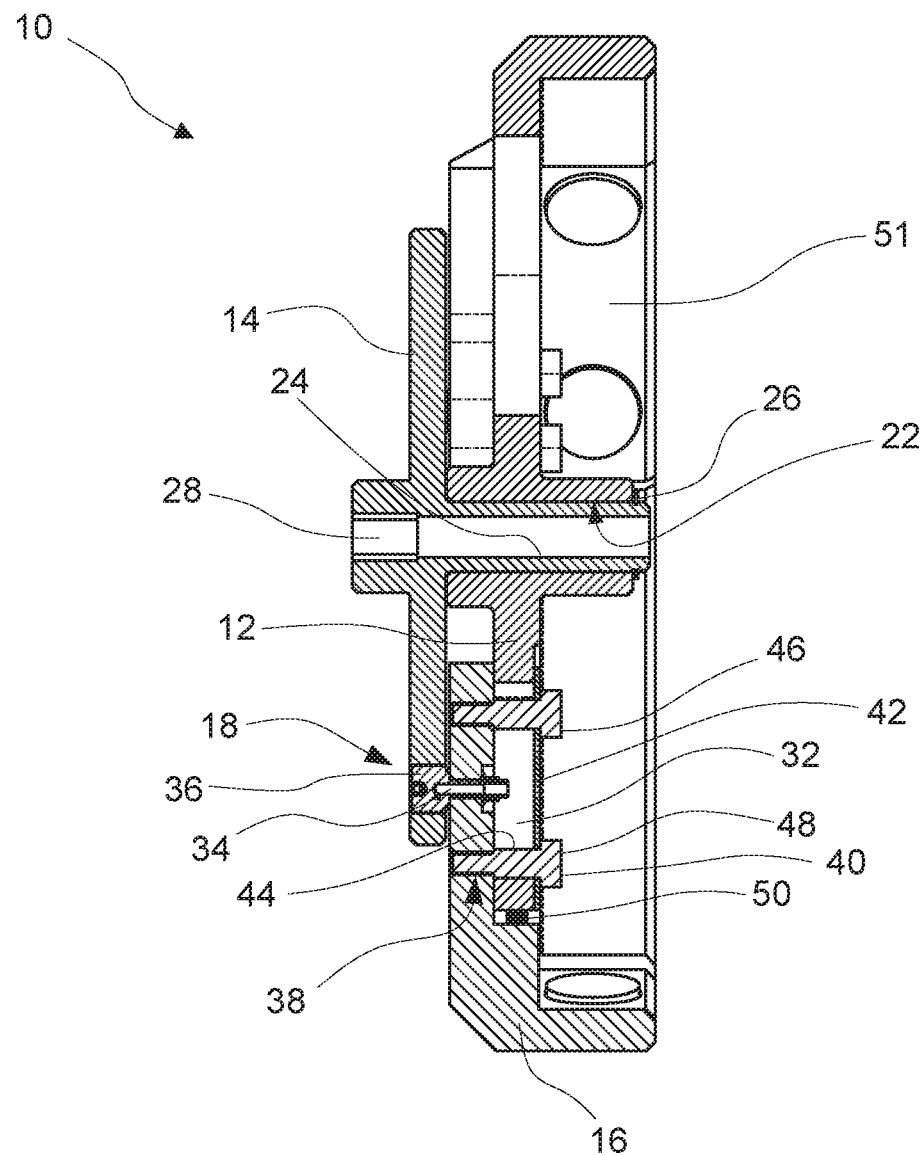
FIG. 4 is a cross-sectional side view of the self-clamping torque adapter shown in FIG. 1 taken about line A-A of FIG. 2.

A bolt head 40 of each bolt 46, 48 may be enlarged relative to the width of the radial slots 32 to secure the respective plurality of clamps 16 to the tool base 12, or, as shown in the example of FIG. 4, a cover 42 can be sized and configured to cover each of the respective radial slots 32 and provide a fastening surface between a respective bolt head 40 and the tool base 12. The bolts 46, 48 can have a shoulder portion 44 having a length that is slightly longer than a thickness of the tool base 12, such that when the bolts 46, 48 are tightened, the clamp 16 and the bolt head 40 or cover 42 do not compress the tool base 12 allowing the bolts 46, 48 to move within the radial slot 32. Thus, the clamp 16 is free to translate axially along radial axis 30 with the bolts 46, 48 sliding within the radial slot 32. The inner and outer bolts 46, 48 can be radially offset within the radial slot 32 to keep the clamps 16 from rotating relative to the tool base 12.

The clamps 16 can be limited in radial travel relative to the tool base 12 by interference between the inner and outer bolts 46, 48 and the ends of the radial slots 32. For example, as shown in FIG. 4, the outer bolt 48 is at its outermost travel limit since it is pressed against an outer end of the radial slot 32. The inner bolt 46 if free to travel radially inward before it hits an inner end of the radial slot 32. The range of travel can be selected to ensure that the clamps 16 do not damage an object being torqued. For example, the inner bolt 46 may hit the inner end of the radial slot 32 to limit inward travel when an inner surface 51 of the clamp 16 is flush with an inner surface 53 of the tool base 12. Thus, once the range of travel is reached, all of the torque applied to the torque input member 28 is transferred to rotational motion rather than further moving the clamps 16.

At least one bias member 50 (see first and second biasing members on each clamp) can bias each of the clamps 16 in a radial direction such as radially inward or radially outward. For example, one or more biasing members 50 in the form of springs can be supported between the clamps 16 and the tool base 12 to bias each clamp 16 to a default position such that when no external torque is applied to the torque input member 28 the clamps 16 remain in the default position. In the example of FIG. 1, the biasing members 50 bias the respective clamps 16 in a radially outward direction. However, in other examples the biasing members 50 may bias the clamps in a radially inward direction.

Each clamp 16 can comprise at least one friction modifier 54 configured to increase friction (a coefficient of friction) between the respective clamps 16 and an object to be torqued. For instance, one or more rubber pads can be secured to an inner surface 51 of a clamp 16 (the inner surface of the clamp 16 designed and intended to interface with a surface of the object to be torqued) to increase friction between the clamp 16 and the objected being clamped. In one aspect, the friction modified 54 can be seated within a recess formed in the inner surface 51 of the clamp 16 to limit distortion when compressed between the clamp 16 and the object being clamped. The friction modifier 54 can comprise any type of object, adhesive, etc. that can be applied or otherwise secured to the inner surface 51 of the clamps 16 to increase a coefficient of friction between the inner surface 51 and the object to be torqued.

The cam actuator mechanism 18 couples each of the plurality of clamps 16 to the central hub 14 in a radial direction. The cam actuator mechanism 18 can be configured, such that rotation of the central hub 14 relative to the tool base 12 can cause the plurality of clamps 16 to move or displace in a radial direction, either radially inward or radially outward. For example, the cam actuator mechanism 18 can be configured to move the plurality of clamps 16 inward (towards the central axis 20) when the central hub 14 rotates from the default position shown in FIGS. 1-4. Thus, when the central hub 14 is rotated in either a clockwise or counterclockwise motion relative to the tool base 12 from the default position, the clamps 16 move inward, clamping on an object proximate the inner surface 51 of the clamps 16. Stated differently, when the central hub 14 is rotated in either a clockwise or counterclockwise motion relative to the tool base 12 from the default position, the clamps 16 move in a first direction or the same direction. In this example, the first direction is an inward direction towards the central axis 20. In another example, such as with the self-clamping torque adapter 110 described below, the first or same direction can comprise an outward direction away from the central axis 120.

In the example shown, the central hub 14 comprises a plurality of curved slots 52 formed along a curve or curved plane that is nonparallel (not parallel) to an outer perimeter of the central hub 14. In one aspect, the curved slots 52 can comprise an arcuate configuration, or be formed as an arc. In another aspect, the curved slots 52 can comprise or be formed as a semi-circle or be semi-circular in configuration. The curved slots 52 can correspond to a closed shape. In other words, the curved slots 52 can be formed along a curved plane extending through or along a center of the curved slots 52 that, if extended or followed, forms a closed geometric shape (e.g., a circle or an ellipse). For example, the curved slots 52 shown in the drawings can each comprise an arc configuration having a corresponding shape in the form of an ellipse (see ellipse 55 in FIG. 2 corresponding to a respective one of the curved slots 52). Depending upon the size of the central hub 14 and the location of the curved slots 52 formed in the central hub 14, each of the curved slots 52 can be configured, such that their respective corresponding closed geometric shape comprises a centroid or geometric center located between the curved slots 52 and the central axis 20 of the central hub 14 (e.g., see centroid 56 of ellipse 55 in FIG. 2). For purposes of this disclosure, in such examples, each curved slot 52 will be described as comprising a centroid or geometric center, it being understood that this refers to the centroid or geometric center of each of their respective corresponding closed geometric shapes. In the event that the curved slots 52 comprise a semi-circular configuration, each of the curved slots 52 can be configured, such that a centroid of each of the curved slots 52 (i.e., a centroid of their corresponding closed geometric circles) is located between the respective curved slot 52 and the central axis 20 of the central hub 14. In any event, each of the curved slots 52 can be configured such that a distance D between the curved slots 52 and the central axis 20 varies along different points of the curved slots 52. For example, with the curved slots 52 sized and configured as shown, the distance D1 between a center or center point (midpoint) of the curved slots 52 and the central axis 20 is the greatest or at a maximum, with this distance decreasing at points located away from the center point of the curved slots and towards the ends of the curved slots 52 in either direction, Specifically, the distances D2 and D3 located at points away from the center point are less than the distance D1. In this example, the distance D2 is less than the distance D1, but greater than the distance D3, thus illustrating how the distances D of measured points progressively decrease the farther away the measured points are located from the center point of the curved slots 52. Stated another way, the curved slots 52 can progressively converge towards the central axis 20 along their length in either direction from the central point of the curved slots 52.

The cam actuator mechanism 18 can comprise a plurality of shafts 34, each having a first end disposed in a respective curved slot 52 of the plurality of curved slots of the central hub 14, and each coupled at a second end to a respective clamp 16 of the plurality of clamps. In some examples, the shafts 34 can each comprise a cam follower bearing 36 to reduce friction between the shafts 34 and the curved slots 52, Because the respective bolts 46, 48 of each clamp 16 constrain the movement of the clamps 16 to be along the radial axis 30, and due to the configuration of the curved slots 52, rotation of the central hub 14 with respect to the tool base 12 causes the curved slots 52 to move each of the respective shafts 34 (and the optional cam follower bearings 36) in a radial direction and to draw the clamps 16 inward as the distance between the central axis 20 and a point along the portion of the curved slot 52 aligned with the radial axis 30 changes. Stated differently, rotation of the central hub 14 in either direction from its default or null position causes the distance of each of the shafts 34 relative to a perimeter of the tool base 12 to change, particularly to increase, or conversely to draw the shafts 34 and the clamps 16 radially inward and closer to the central axis 20. The tool base 12, the central hub 14, and the cam actuator mechanism 18 can be configured, such that the clamps 16 are able to be drawn inward a sufficient distance from their default or null position so as to impart a clamping force on the object to be clamped, and then to be able to release the clamping force by rotating the central hub 14 in an opposite direction. The default positon of the clamps 16 and the displacement distance or available travel of the clamps 16 can vary with different design configurations, and as needed or desired, as will be apparent to those skilled in the art.

Figure 2:
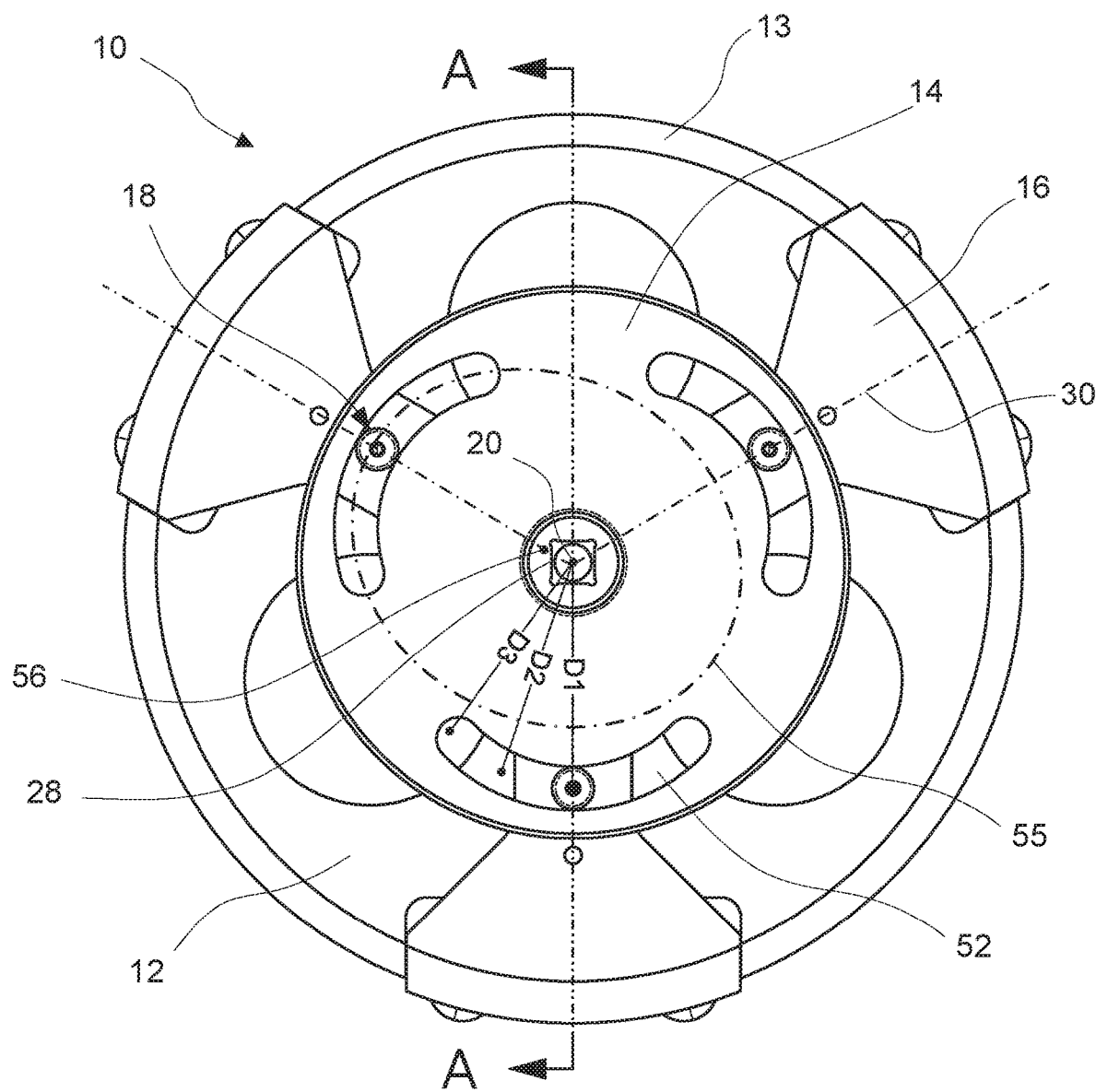
FIG. 2 is a front view of the self-clamping torque adapter shown in FIG. 1.
Figure 3:
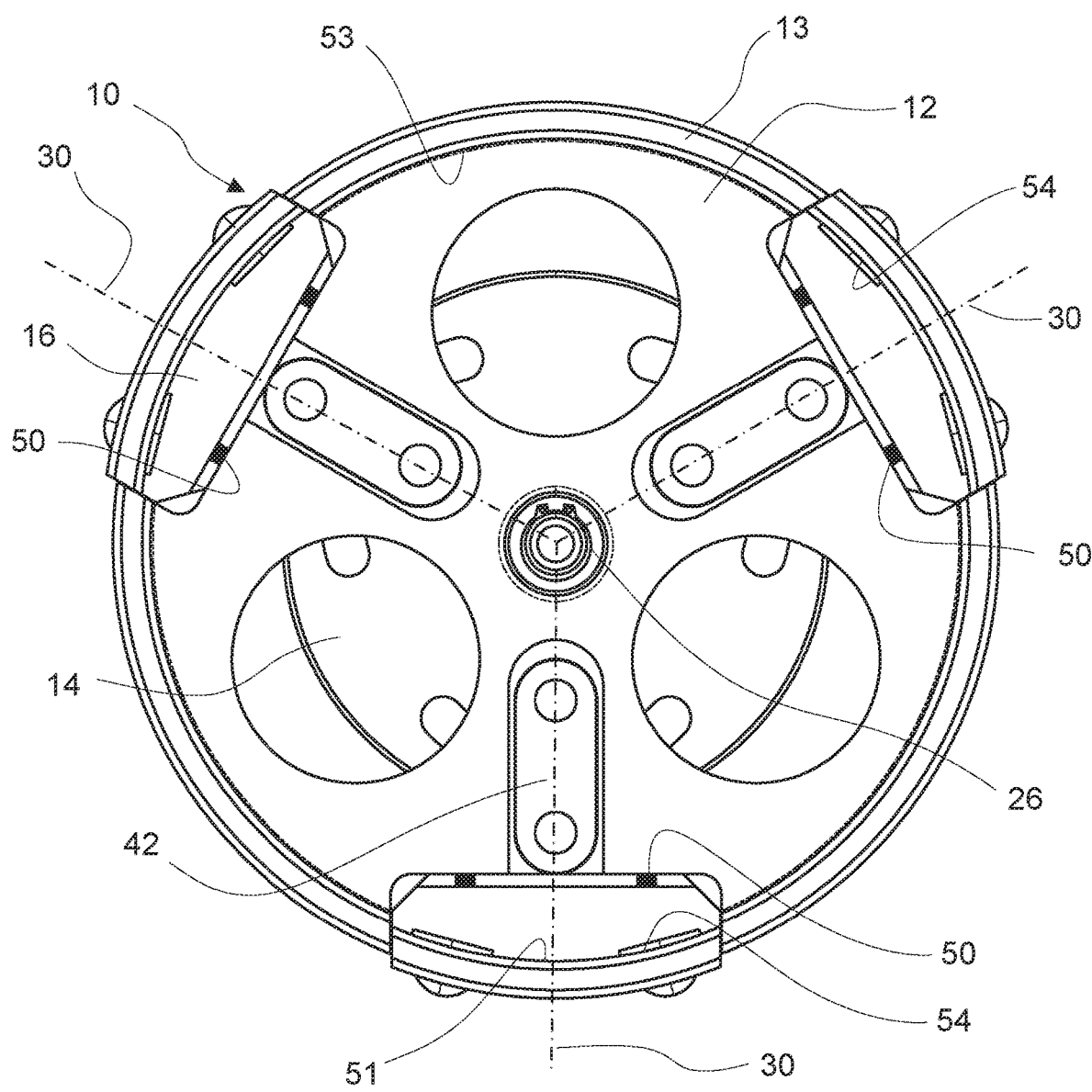
FIG. 3 is a rear view of the self-clamping torque adapter shown in FIG. 1.
Figure 5:
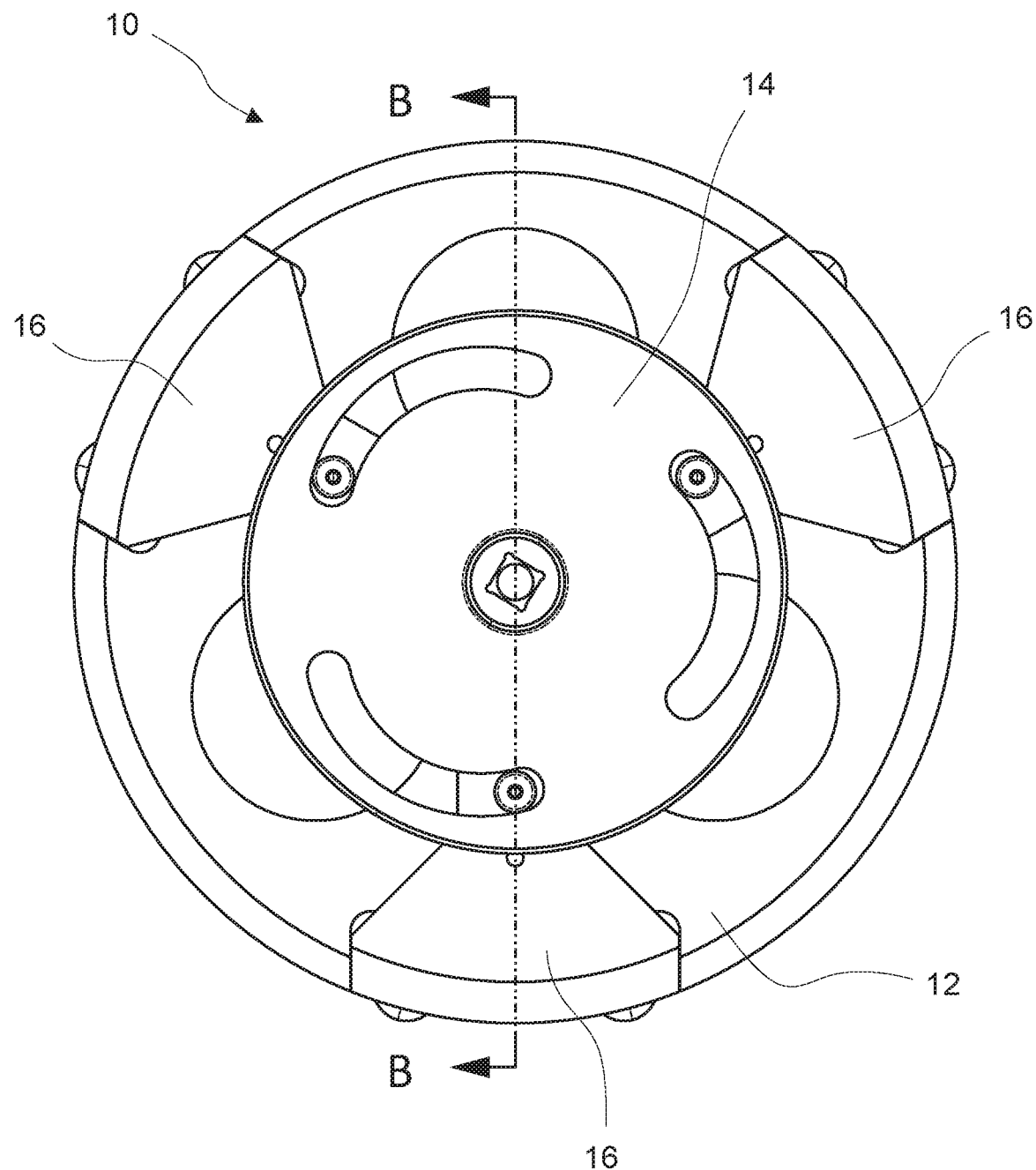
FIG. 5 is a rear view of the self-clamping torque adapter shown in FIG. 1, with the plurality of clamps shown in a clamping position.
Figure 6:
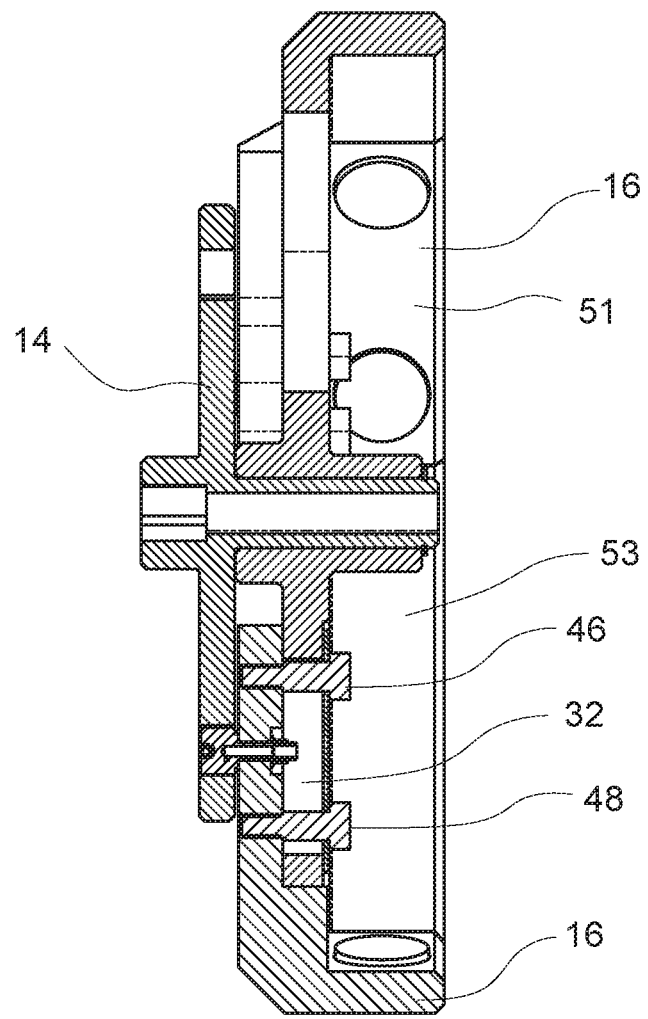
FIG. 6 is a cross-sectional side view of the self-clamping torque adapter shown in FIG. 1, taken about line B-B of FIG. 5, with the plurality of clamps shown in a clamping position.

FIG. 5 illustrates an example operating position of the self-clamping torque adapter 10 with the central hub 14 having been rotated clockwise from its default or null position shown in FIGS. 1-3, and relative to the tool base 12, such that the clamps 16 are in a clamping position. FIG. 6 illustrates a cross-section of the self-clamping torque adapter 10 taken about line B-B in FIG. 5. As can be seen in FIG. 6, the bolts 46, 48 have translated axially inward such that the inner bolt 46 is now adjacent the end of the radial slot 32. In this position, the inner surface 51 of the clamp 16 is shown as being flush with the inner surface 53 of the flange of the tool base 12. In other examples, the inner surface 51 of the clamp 16 may be drawn inward so as to extend beyond the inner surface 53 of the flange of the tool base 12. Again, the range of travel and the distance required to impart a clamping force can vary depending upon the design of the self-clamping torque adapter 10. Thus, an object to be torqued having an outer diameter that closely fits within the space defined by the inner surface 53 of the flange of the tool base 12 can be clamped by the clamps 16 when the central hub 14 is rotated relative to the tool base 12. Although not shown, because the curved slots 52 are symmetric about the central axis 20 and the axes 30, and because the default or null position of the clamps 16 is with the shafts of the cam actuator mechanism 18 positioned at a midpoint or center point of the curved slots 52, the clamping action can be actuated and a clamping force imparted to the object to be torqued when the central hub 14 is rotated clockwise or counterclockwise relative to the tool base 12. As such, the self-clamping torque adapter 10 can be used to apply a torque in two rotational directions, namely for the purpose of threading or screwing the object to be torqued onto another object, and/or unthreading or unscrewing the object to be torqued from the other object.

Figure 7:
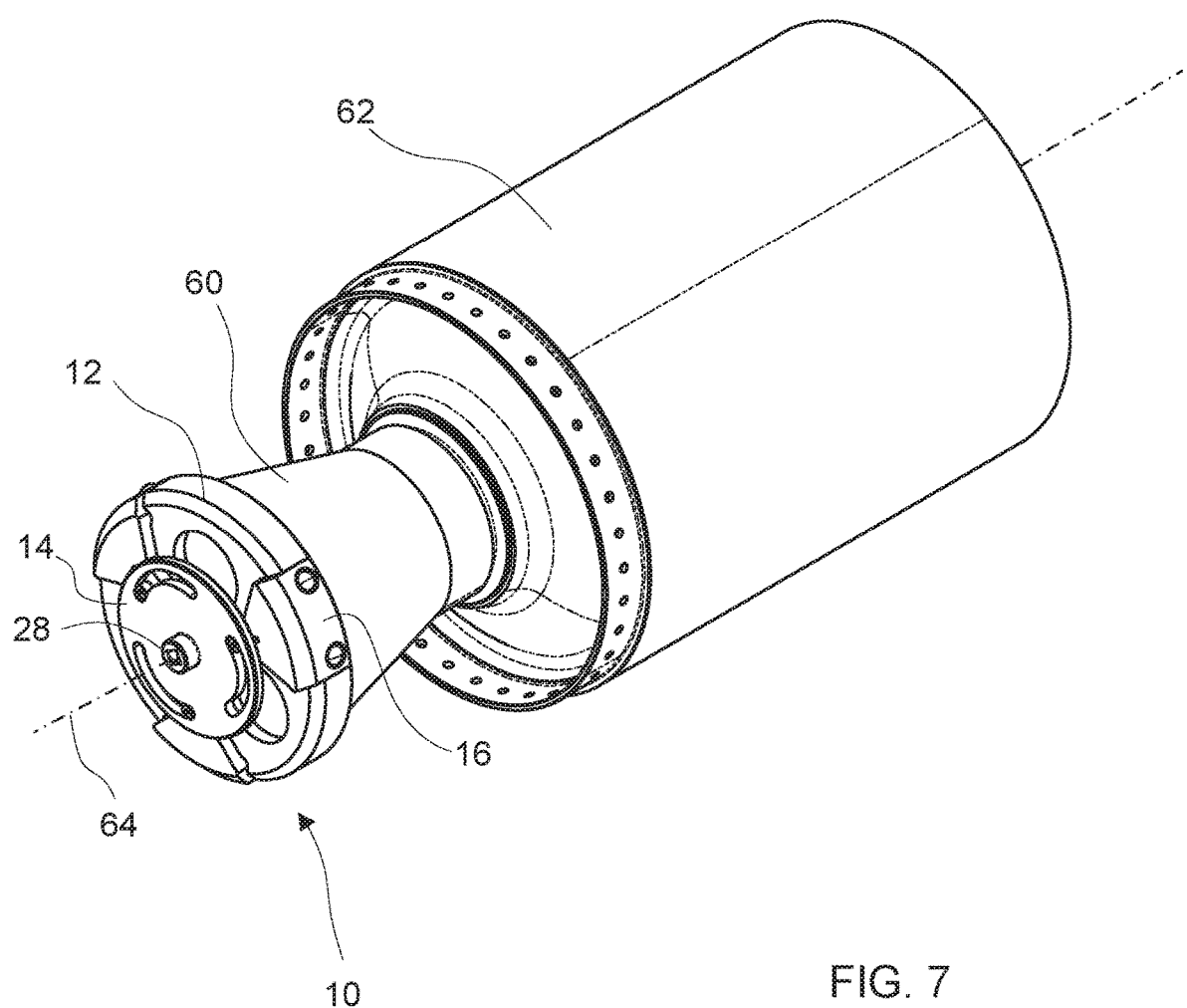
FIG. 7 is an isometric view of the self-clamping torque adapter of FIG. 1 shown in use with an example object to be torqued, the self-clamping torque adapter facilitating torqueing of the object.
Figure 8:
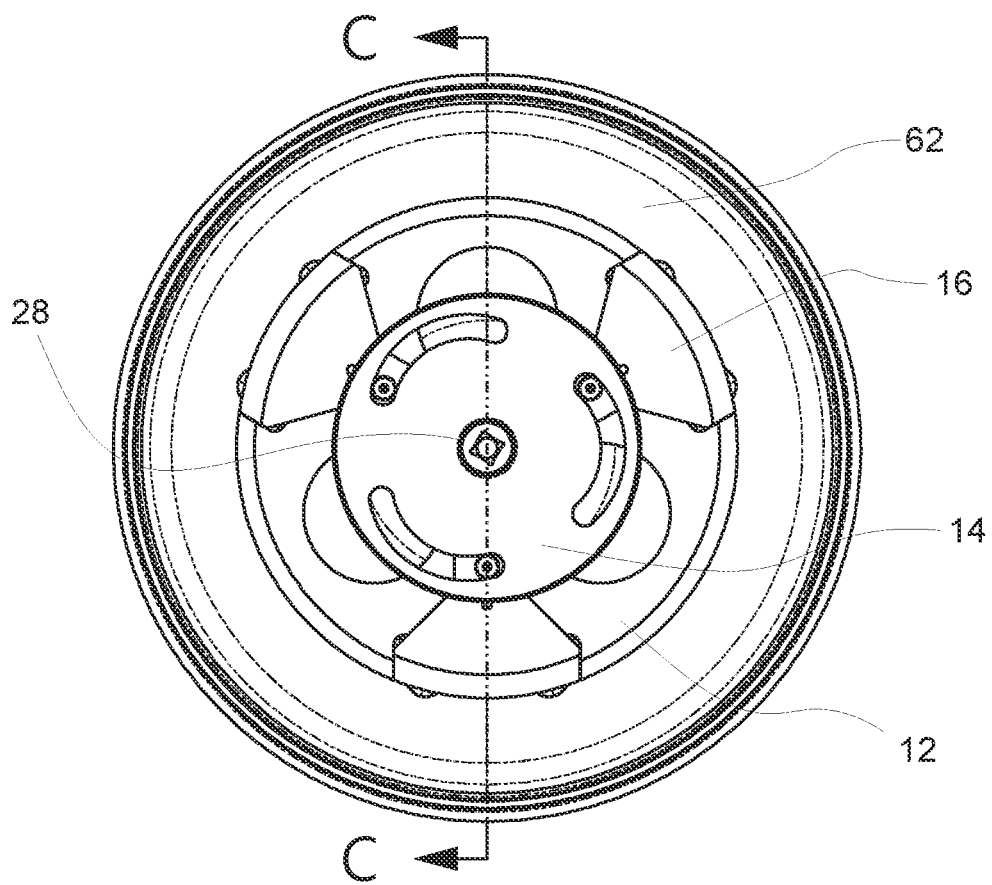
FIG. 8 is a front view of the self-clamping torque adapter shown in FIG. 1 shown in use with the object to be torqued of FIG. 7.
Figure 9:
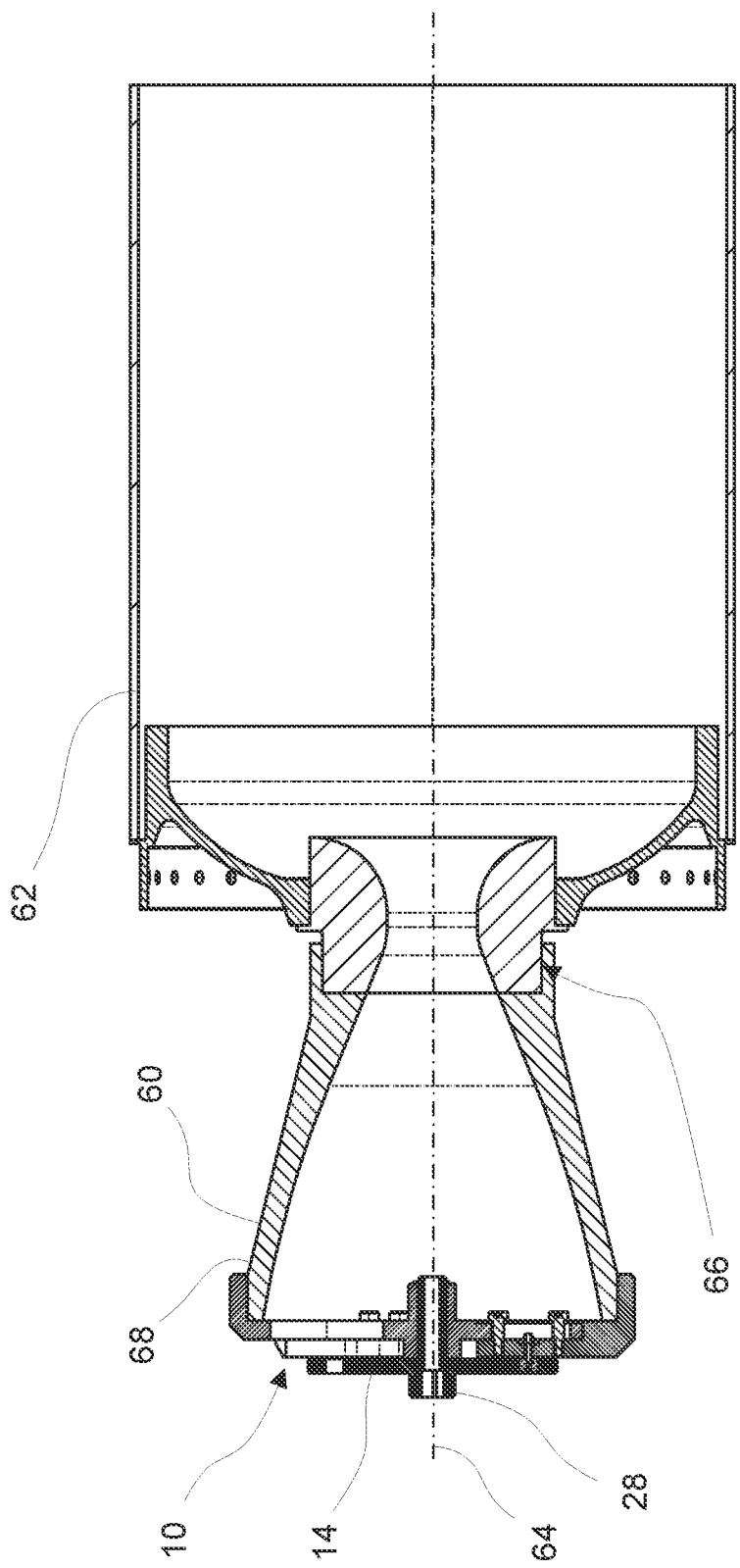
FIG. 9 is cross-sectional side view of the self-clamping torque adapter shown in FIG. 1 shown in use with the object to be torqued of FIG. 7, taken about line -CC- of FIG. 8.

FIGS. 7, 8, and 9 illustrate an example operation or use of the self-clamping torque adapter 10, wherein the self-clamping torque adapter 10 is being used to torque a first component 60 to a second component 62. For example, first component 60 and second component 62 may be coupled by a threaded connection 66 requiring a precise amount of torque during assembly. In one example, the first component 60 can comprise a rocket motor exit cone and the second component 62 can comprise a rocket motor. However, this is not intended to be limiting in any way as those skilled in the art will recognize that the self-clamping torque adapter 10 can be configured to be operable with a number of different components that couple to one another. As shown, the central hub 14 has been rotated from the default or null position, wherein the clamps 16 are drawn radially inward to grip an outer surface 68 of the first component 60. As indicated above, rotation of the central hub 14 can be achieved via a torque tool, such as a torque wrench, engaged with the torque input member 28. Thus, a torque applied to the torque input member 28 of the self-clamping torque adapter 10 is transferred to the first component 60 to cause the first component 60 to rotate to a desired torque. Because the torque input member 28 is centered relative to an axis of rotation 64 of the of the threaded connection 66, a torque measured at the torque input member 28 can accurately reflect the torque applied at the threaded connection 66, as compared to a torque input member that is offset from the axis of rotation 64. Additionally, since the clamps 16 are limited in travel by the hard stops provided by either the first and second ends of the curved slots 52 or the radial slots 32, there is no danger of the clamps 16 compressing the first component 60 too tightly. Thus, the self-clamping torque adapter 10 can be used to clamp onto and torque brittle or breakable objects.

Figure 10:
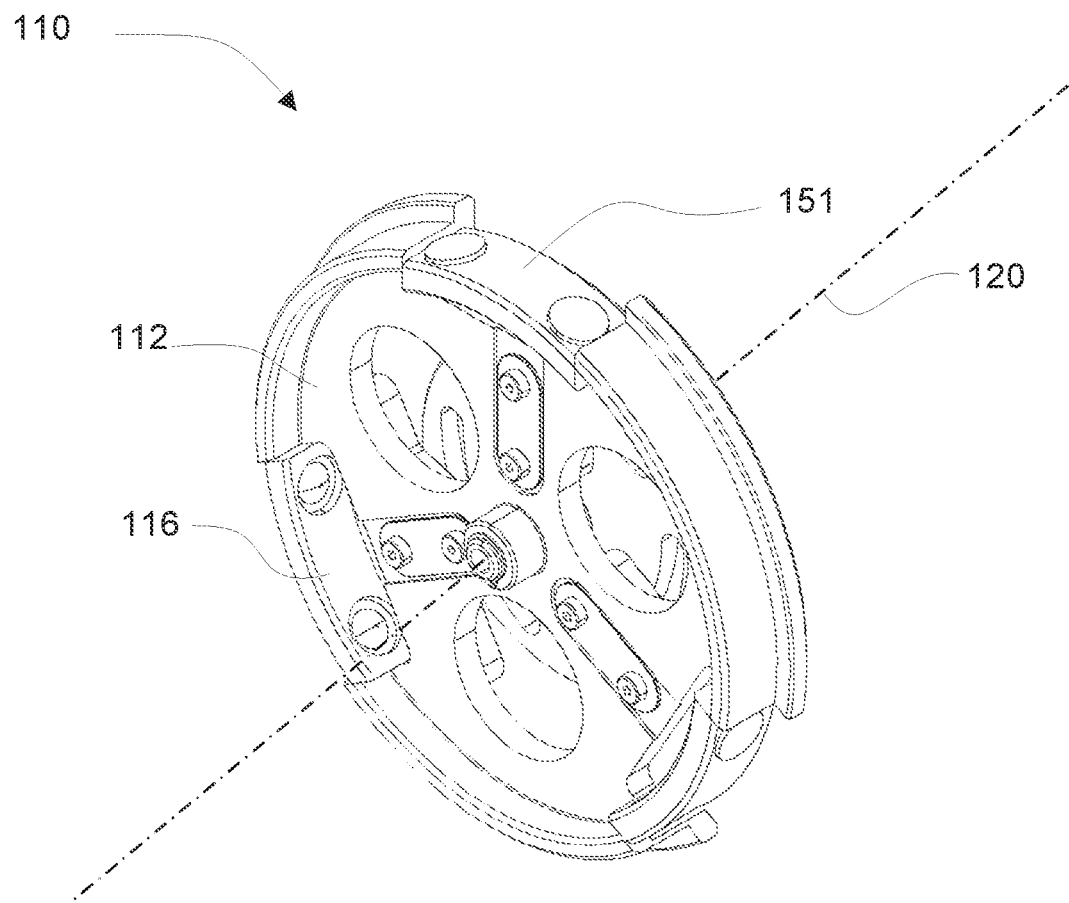
FIG. 10 is an isometric view of a self-clamping torque adapter with a plurality of clamps shown in a default position, in accordance with an example of the present disclosure.
Figure 11:
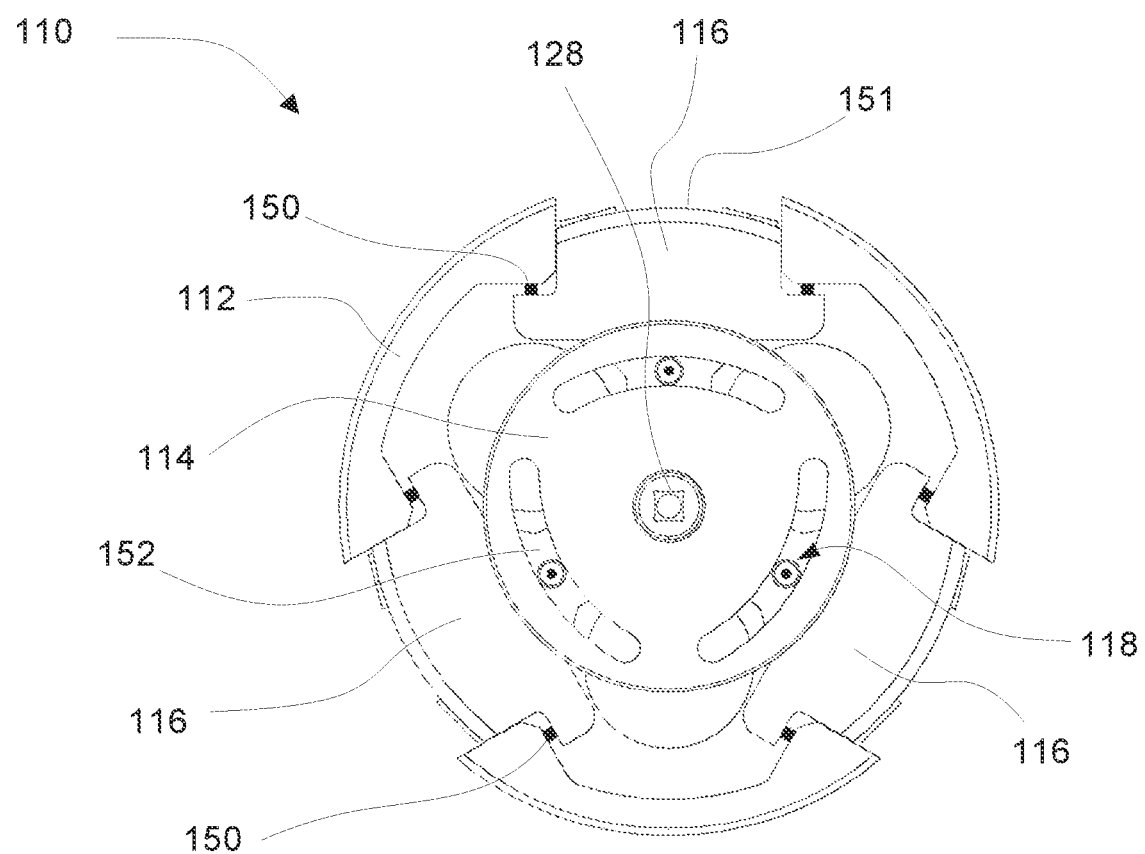
FIG. 11 is a front view of the self-clamping torque adapter shown in FIG. 10.
Figure 12:
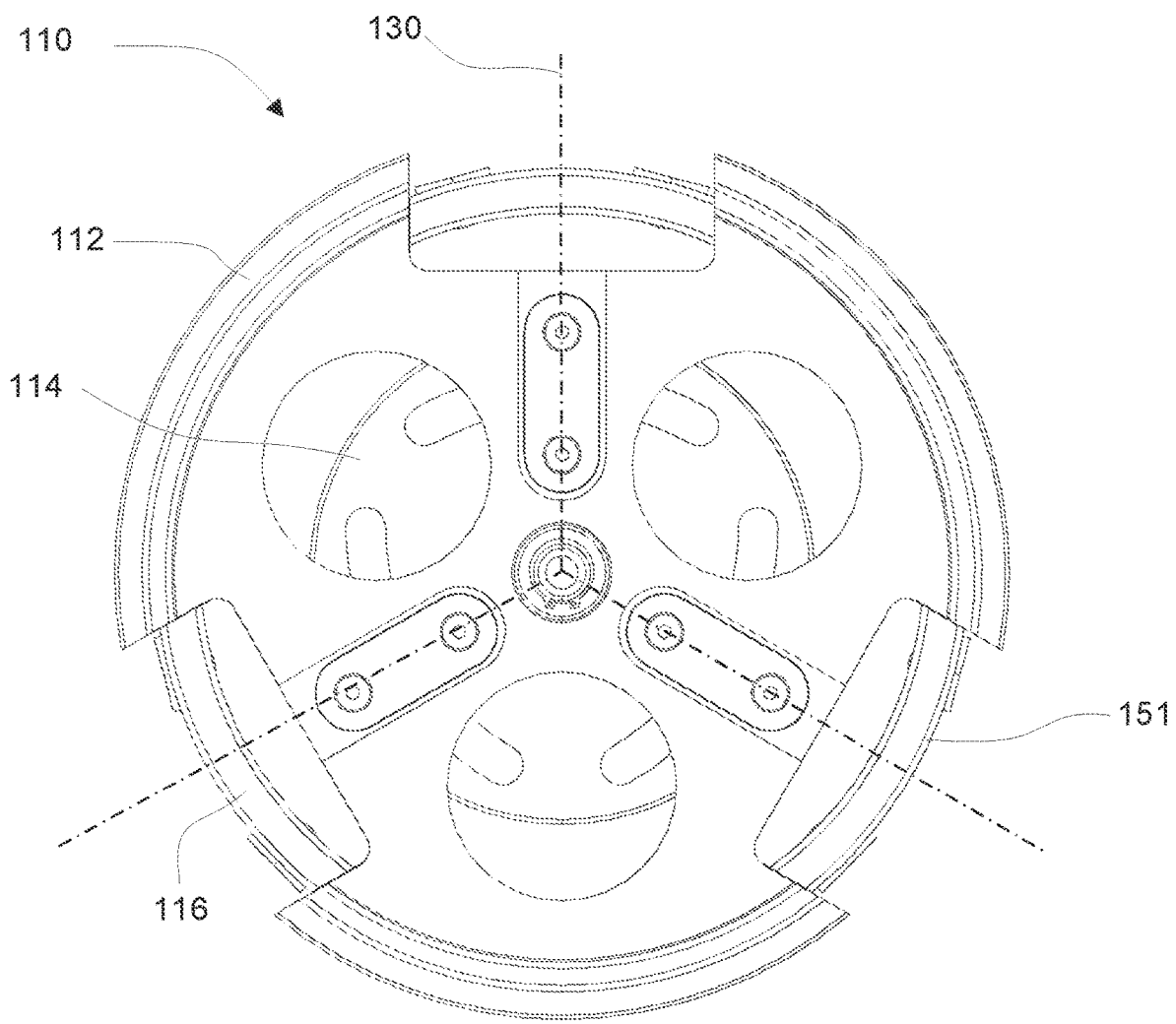
FIG. 12 is a rear view of the self-clamping torque adapter shown in FIG. 10.

FIGS. 10-12 illustrate a self-clamping torque adapter 110 in accordance with an example of the present disclosure. The self-clamping torque adapter 110 of FIGS. 10-12 is similar to the self-clamping torque adapter 10 of FIGS. 1-5 and like elements may not be repeated in the below discussion as the self-clamping torque adapter 10 of FIGS. 1-5 discussed above may be referenced for a discussion of the same or similar elements, where relevant and applicable to the self-clamping torque adapter 110, as will be apparent to those skilled in the art. One notable difference from the self-clamping torque adapter 10 of FIGS. 1-5 is that the self-clamping torque adapter 110 of FIGS. 10-12 clamps to the inside or inner surface of an object being torqued as compared to the outside of the object being torqued as with the example of FIGS. 1-5.

The self-clamping torque adapter 110 can comprise a tool base 112, a central hub 114, a plurality of clamps 116, and a cam actuator mechanism 118. The tool base 112 can have a central axis 120 and the central hub 114 can be configured to rotate relative to the tool base 112 about the central axis 120 of the tool base 112. The central hub 114 can comprise a torque input member 128 configured to receive a torque input, such as a torque from a hand tool, a powered tool, or a fixed handle. The torque input member 128 can be centered relative to a center of rotation of the self-clamping torque adapter 110 for greater accuracy when using a torque wrench to rotate the self-clamping torque adapter 110.

At least one biasing member 150 can bias each of the clamps 116 in an inward radial direction. For example, one or more biasing members 150 in the form of a spring can be supported between the tool base 112 and each of the clamps 116, wherein the biasing members 150 function to bias each clamp 116 to an inward, default or null position, such that when no external torque is applied to the torque input member 128, the clamp 116 remains in the inward, default position. The cam actuator mechanism 118 couples each of the plurality of clamps 116 to the central hub 114 in a radial direction, Rotation of the central hub 114 relative to the tool base 112 can cause the cam actuator mechanism 118 to move each of the plurality of clamps 116 in a radial direction, either radially inward or radially outward. For example, the self-clamping torque adapter 110 of FIG. 10 is configured to move the plurality of clamps 116 outward when the central hub 114 is rotated from the default or null position shown in FIGS. 10-12. Thus, when the central hub 114 is rotated in either a clockwise or counterclockwise motion relative to the tool base 112, the clamps 116 move outward, clamping on an interior surface of an object proximate an outer surface 151 of the clamps 116. The cam actuator mechanism 118 can include one or more friction modifiers supported or applied to the respective surfaces 151 of the clamps 116.

In the example of FIG. 10, the central hub 114 comprises a plurality of curved slots 152. Unlike the curved slots 52 of the self-clamping torque adapter 10 discussed above, the curved slots 152 of the self-clamping torque adapter 110 comprise a configuration, such that the distance between the curved slot 152 and the central axis 120 is at a minimum at the center or midpoint of the curved slot 152 and increases towards the first and second ends of the curved slot 152. Stated another way, the curved slots 152 can progressively diverge away from the central axis 20 along their length in either direction from the central point of the curved slots 52. The cam actuator mechanism 118 comprises a plurality of shafts (and cam follower bearings), each disposed in a respective curved slot 152 of the plurality of curved slots and each coupled to a respective clamp 116 of the plurality of clamps. Because the respective bolts of each clamp 116 constrain the movement of the respective clamp 116 to be along the radial axis 130, rotation of the central hub 114 with respect to the tool base 112 causes the curved slots 152 to move the respective shaft in a radial direction as the distance between the central axis 120 and the portion of the curved slot 152 aligned with the radial axis 30 changes. Since the curved slot 152 is configured such that the distance between the curved slot 152 and the central axis 120 is at a minimum at the center or midpoint of the curved slot 152 and increases towards the first and second ends of the curved slot 152, rotation of the central hub 114 causes the shaft to move away from the central axis 120, in turn causing the clamp 116 to move radially outward.

Figure 13:
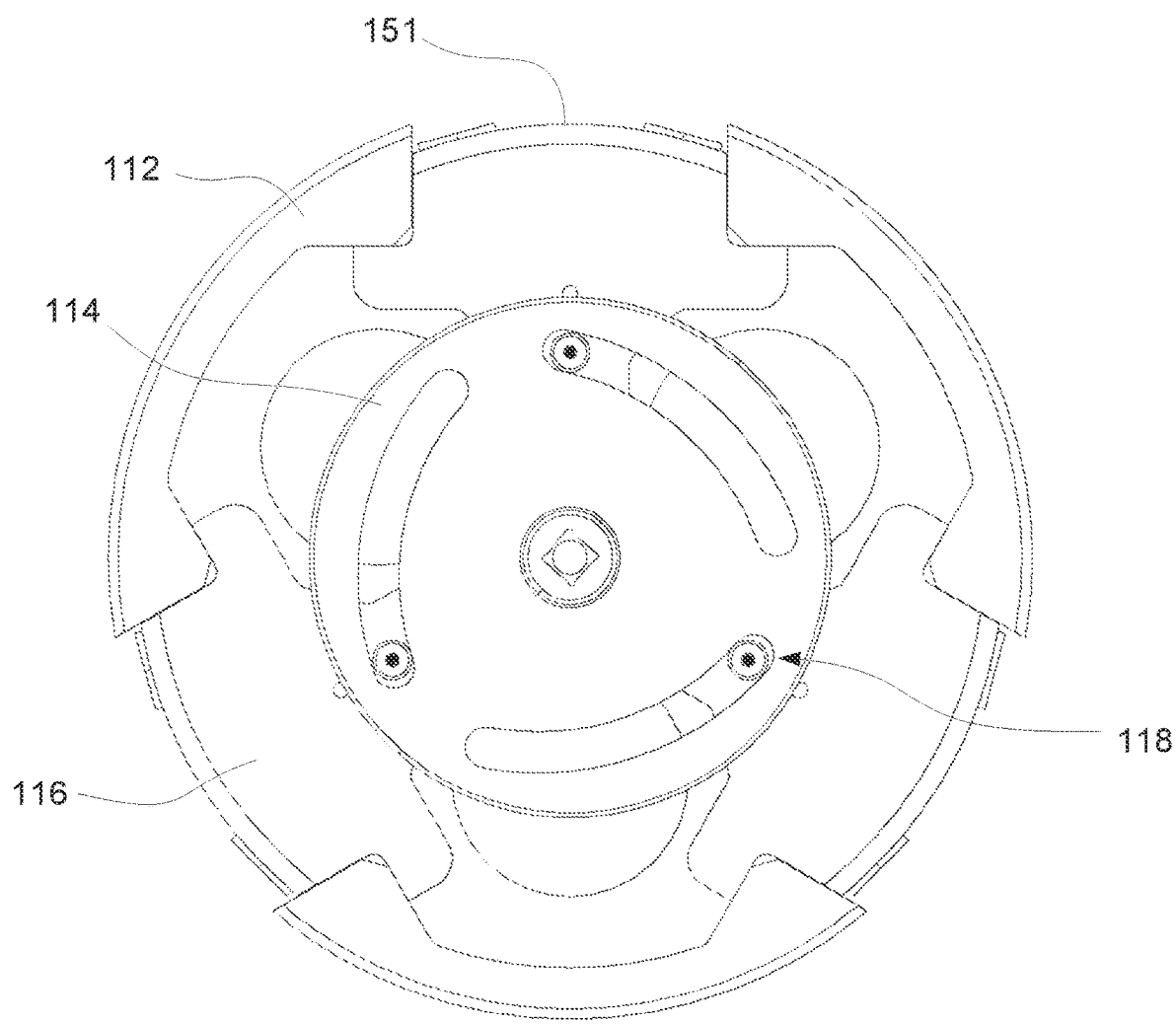
FIG. 13 is a front view of the self-clamping torque adapter shown in FIG. 10 with the clamps moved to a clamping position.

FIG. 13 illustrates an example of the self-clamping torque adapter 110 of FIG. 10 with the central hub 114 having been rotated clockwise relative to the tool base 112 such that the clamps 116 are in a clamping position. The clamps 116 and the outer surfaces 151 of the clamps 16 have moved radially outward with respect to the tool base 112. In one example, the self-clamping torque adapter 110 can be configured such that the outer surfaces 151 of the clamps 116 are caused to be flush or slightly below the outer surface of the flange of the tool base 112 when the central hub 114 is fully rotated. In other examples, the self-clamping torque adapter 110 can be configured such that the outer surfaces 151 of the clamps 116 are caused to extend beyond the outer surface of the flange of the tool base 112 when the central hub 114 is fully rotated. Thus, an object to be torqued having an inner diameter that is close to the outer diameter of the flange of the tool base 112 can be clamped by the clamps 116 when the central hub 114 is rotated relative to the tool base 112.

Because the curved slots 152 are symmetric about the central axis 120 and the axes 130, the clamping action is achieved when the central hub 114 is rotated clockwise or counterclockwise relative to the tool base 112.

Figure 14:
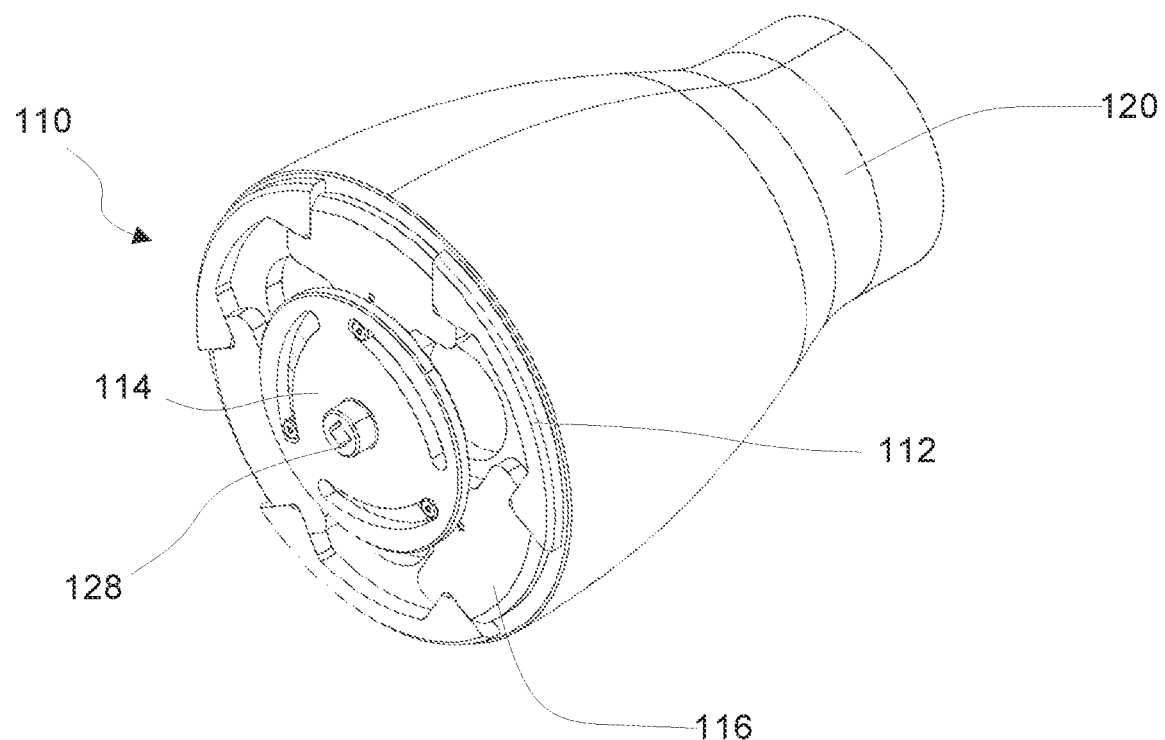
FIG. 14 is an isometric view of the self-clamping torque adapter shown in FIG. 10 shown in use with an example object to be torqued, the self-clamping torque adapter facilitating torqueing of the object.

FIG. 14 illustrates an example of the self-clamping torque adapter 110 being fitted to an inner surface of a cone 160. For example, the cone 160 may require being coupled to another component using a threaded connection that requires a precise amount of torque during assembly. As shown in FIG. 14, the central hub 114 has been rotated from the default position, moving the clamps 116 radially outward to grip the inner surface of the cone 160. Thus, a torque applied to the torque input member 128 of the self-clamping torque adapter 110 is transferred to the cone 160. Because the torque input member 128 is centered relative to an axis of rotation of the cone 160, a torque measured at the torque input member 128 can accurately reflect the torque applied at the threaded connection, as compared to a torque input member that is offset from the axis of rotation.

According to the various features, components, and functions described in this disclosure, the concepts described herein present several improvements over current technologies for torqueing large objects, including those that may be relatively brittle. The central location of the torque input member results in a torque measurement that accurately measures the torque being applied to the component. Additionally, the use of three points of contact limits point loads that can damage the object being torqued. The use of a hard stop for the clamps prevents the clamps from damaging the object. Finally, the disclosed self-clamping torque adapter can be used to torque the object in either direction without any modification or refitting of the self-clamping torque adapter, thus allowing a torque to be applied to the object being torqued in either direction (such as to thread the object to or unthread the object from another object).

Reference was made to the examples illustrated in the drawings and specific language was used herein to describe the same. It will nevertheless be understood that no limitation of the scope of the technology is thereby intended. Alterations and further modifications of the features illustrated herein, and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A self-clamping torque adapter comprising:
   a tool base having a central axis;
   a central hub rotatably coupled to the tool base and configured to rotate relative to the tool base about the central axis, the central hub comprising a torque input member configured to receive a torque input;
   a plurality of clamps slidably coupled to the tool base, and configured to displace bi-directionally along a radial axis;
   a cam actuator mechanism coupling each of the plurality of clamps to the central hub, wherein rotation of the central hub relative to the tool base causes the cam actuator mechanism to move each of the plurality of clamps in a radial direction; and
   at least one biasing member biasing a clamp of the plurality of clamps in a radial direction.

2. The self-clamping torque adapter of claim 1, wherein the at least one biasing member comprises at least one spring.

3. The self-clamping torque adapter of claim 1, wherein each of the plurality of clamps comprises a friction modifier configured to increase friction between a respective clamp and an object being clamped.

4. The self-clamping torque adapter of claim 1, wherein the central hub comprises a plurality of curved slots and the cam actuator mechanism comprises a plurality of shafts with each shaft disposed in a respective slot of the plurality of slots, and wherein each shaft is coupled to a respective clamp of the plurality of clamps.

5. The self-clamping torque adapter of claim 4, wherein the cam actuator mechanism comprises a range of travel limited by a configuration of the curved slots, thus providing a hard stop of each of the plurality of clamps, and thus limiting radial travel of the plurality of clamps.

6. The self-clamping torque adapter of claim 5, wherein the hard stop limits travel of the plurality of clamps in at least one of a radially outward direction or a radially inward direction.

7. The self-clamping torque adapter of claim 4, wherein a centroid of each of the plurality of curved slots is located between the plurality of curved slots, respectively, and the central axis.

8. The self-clamping torque adapter of claim 4, wherein a centroid of each of the plurality of curved slots is located outside of an area between the plurality of curved slots, respectively, and the central axis.

9. The self-clamping torque adapter of claim 4, wherein a distance between the central axis and a point in the curved slots at a location offset from a midpoint of the curved slots and along a central plane of the curved slots is one of greater than or less than a distance between the central axis and the midpoint.

10. The self-clamping torque adapter of claim 1, wherein each of the plurality of clamps have a default position, and wherein, with each of the plurality of clamps in the default position, a counterclockwise rotation of the central hub relative to the tool base causes each of the plurality of clamps to move in a first direction relative to the default position, and a clockwise rotation of the central hub relative to the tool base causes each of the plurality of clamps to also move in the first direction relative to the default position.

11. The self-clamping torque adapter of claim 1, wherein the tool base comprises a plurality of linear slots extending in a radial direction and each of the plurality of clamps is slidably coupled to the tool base by at least one bolt extending through a linear slot of the plurality of linear slots.

12. The self-clamping torque adapter of claim 11, wherein each of the bolts are limited in radial travel by a respective linear slot thus providing a hard stop of each of the plurality of clamps, and thus limiting radial travel of the plurality of clamps.

13. A torqueing system comprising:
an object to be torqued, the object having a torque receiving surface and an axis of rotation; and
a self-clamping torque adapter comprising:
 a tool base having a central axis aligned with the axis of rotation;
 a central hub rotatably coupled to the tool base and configured to rotate relative to the tool base about the central axis, the central hub comprising a torque input member configured to receive a torque input;
 a plurality of clamps slidably coupled to the tool base, and configured to displace bi-directionally along a radial axis to apply a clamping force to the torque receiving surface;
 a cam actuator mechanism coupling each of the plurality of clamps to the central hub, wherein rotation of the central hub relative to the tool base causes the cam actuator mechanism to move each of the plurality of clamps in a radial direction to provide a variable clamping force to the object to be torqued depending upon the travel of the plurality of clamps; and
 at least one biasing member biasing a clamp of the plurality of clamps in a radial direction.

14. The torqueing system of claim 13, wherein the self-clamping torque adapter further comprises a friction modifier disposed between each of the clamps and the torque receiving surface.

15. The torqueing system of claim 13, wherein the central hub comprises a plurality of curved slots and the cam actuator mechanism comprises a plurality of shafts with each shaft disposed in a respective slot of the plurality of slots, and wherein each shaft is coupled to a respective clamp of the plurality of clamps.

16. The torqueing system of claim 15, wherein a centroid of each of the plurality of curved slots is located between the plurality of curved slots, respectively, and the central axis.

17. The torqueing system of claim 15, wherein a centroid of each of the plurality of curved slots is located outside of an area between the plurality of curved slots, respectively, and the central axis.

18. The torqueing system of claim 13, wherein each of the plurality of clamps have a default position, and wherein, with each of the plurality of clamps in the default position, a counterclockwise rotation of the central hub relative to the tool base causes each of the plurality of clamps to move in a first direction relative to the default position, and a clockwise rotation of the central hub relative to the tool base causes each of the plurality of clamps to also move in the first direction relative to the default position.

19. A method of torqueing an object comprising:
positioning a self-clamping torque adapter proximate an end of an object being torqued, the self-clamping torque adapter comprising:
 a tool base having a central axis aligned with an axis of rotation of the object being torqued;
 a central hub rotatably coupled to the tool base and configured to rotate relative to the tool base about the central axis, the central hub comprising a torque input member configured to receive a torque input;
 a plurality of clamps slidably coupled to the tool base, and configured to displace bi-directionally along a radial axis;
 a cam actuator mechanism coupling each of the plurality of clamps to the central hub, wherein rotation of the central hub relative to the tool base causes the cam actuator mechanism to move each of the plurality of clamps in a radial direction to provide a variable clamping force to the object being torqued; and
 at least one biasing member biasing a clamp of the plurality of clamps in a radial direction;
applying a torque to the torque input member to cause the central hub to rotate relative to the tool base and each of the plurality of clamps to move radially to apply a clamping force to the object being torqued.

20. A self-clamping torque adapter comprising:
a tool base having a central axis;
a central hub rotatably coupled to the tool base and configured to rotate relative to the tool base about the central axis, the central hub comprising a torque input member configured to receive a torque input;
a plurality of clamps slidably coupled to the tool base, and configured to displace bi-directionally along a radial axis; and
a cam actuator mechanism coupling each of the plurality of clamps to the central hub, wherein rotation of the central hub relative to the tool base causes the cam actuator mechanism to move each of the plurality of clamps in a radial direction,
wherein each of the plurality of clamps comprises a friction modifier configured to increase friction between a respective clamp and an object being clamped.

21. A self-clamping torque adapter comprising:
a tool base having a central axis;
a central hub rotatably coupled to the tool base and configured to rotate relative to the tool base about the central axis, the central hub comprising a torque input member configured to receive a torque input;
a plurality of clamps slidably coupled to the tool base, and configured to displace bi-directionally along a radial axis; and
a cam actuator mechanism coupling each of the plurality of clamps to the central hub, wherein rotation of the central hub relative to the tool base causes the cam actuator mechanism to move each of the plurality of clamps in a radial direction,
wherein the tool base comprises a plurality of linear slots extending in a radial direction and each of the plurality of clamps is slidably coupled to the tool base by at least one bolt extending through a linear slot of the plurality of linear slots.

22. A torqueing system comprising:
an object to be torqued, the object having a torque receiving surface and an axis of rotation; and
a self-clamping torque adapter comprising:
 a tool base having a central axis aligned with the axis of rotation;
 a central hub rotatably coupled to the tool base and configured to rotate relative to the tool base about the central axis, the central hub comprising a torque input member configured to receive a torque input;

a plurality of clamps slidably coupled to the tool base, and configured to displace bi-directionally along a radial axis to apply a clamping force to the torque receiving surface;

a cam actuator mechanism coupling each of the plurality of clamps to the central hub, wherein rotation of the central hub relative to the tool base causes the cam actuator mechanism to move each of the plurality of clamps in a radial direction to provide a variable clamping force to the object to be torqued depending upon the travel of the plurality of clamps; and a friction modifier disposed between each of the clamps and the torque receiving surface.

* * * * *